United States Patent
Shaw et al.

(10) Patent No.: US 9,958,898 B1
(45) Date of Patent: May 1, 2018

(54) COMPRESSION ASSISTED SERVICE ACCESS FOR NARROW BORDER MOBILE INFORMATION HANDLING SYSTEMS

(71) Applicant: Dell Products, LP, Round Rock, TX (US)

(72) Inventors: Timothy C. Shaw, Austin, TX (US); Mark Menendez, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days. days.

(21) Appl. No.: 15/621,626

(22) Filed: Jun. 13, 2017

(51) Int. Cl.
*G06F 1/16* (2006.01)
*G06F 3/041* (2006.01)

(52) U.S. Cl.
CPC .......... *G06F 1/1601* (2013.01); *G06F 1/1626* (2013.01); *G06F 1/1632* (2013.01); *G06F 1/1637* (2013.01); *G06F 1/1656* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 251,591 A | 12/1881 | Jaeger | |
| 761,312 A | 5/1904 | Luellen | |
| 2,258,948 A | 10/1941 | Garrsion | |
| 2,446,113 A | 7/1948 | Spiller | |
| 2,533,377 A | 12/1950 | Keef | |
| 2,629,435 A | 2/1953 | Dadswell | |
| 3,165,225 A | 1/1965 | Reitzel | |
| 3,675,084 A | 7/1972 | Jammaud | |
| RE28,994 E | 10/1976 | Aylworth | |
| 4,342,135 A | 8/1982 | Matsuo | |
| 4,500,120 A | 2/1985 | Ridgewell | |
| 4,714,284 A | 12/1987 | Varlet | |
| 4,881,764 A | 11/1989 | Takahashi | |
| 5,004,431 A | 4/1991 | Previato | |
| 5,026,130 A | 6/1991 | Wright | |
| 5,106,143 A | 4/1992 | Soeters | |
| 5,199,777 A | 4/1993 | Taima | |
| 5,438,685 A * | 8/1995 | Sorensen | H04B 1/3877 361/814 |
| 5,577,779 A | 11/1996 | Dangel | |
| 5,586,003 A | 12/1996 | Schmitt | |
| 5,711,554 A | 1/1998 | Brown | |
| 5,743,606 A * | 4/1998 | Scholder | F16B 12/26 220/786 |

(Continued)

*Primary Examiner* — Xanthia C Cunningham
(74) *Attorney, Agent, or Firm* — Prol Intellectual Property Law, PLLC; H. Kenneth Prol

(57) ABSTRACT

A mobile information handling system comprising a chassis having a processor, a memory, and a wireless interface with a display screen operatively coupled to the chassis and the chassis having a spring, such as shape memory foam pads, internally mounted thereon and compressed between the chassis and the display screen and a mechanical connector fittingly engaging an access side of the chassis with the display screen, wherein the mechanical connector maintains pressure on the spring by holding the display screen in a closed position and an access seam at the edge of the display screen is operable to open due to a counter force exerted by the spring when the mechanical connector is disengaged from the display screen.

20 Claims, 6 Drawing Sheets

(56) References Cited

U.S. PATENT DOCUMENTS

| | | |
|---|---|---|
| 5,758,937 A | 6/1998 | Lammens |
| 5,820,235 A | 10/1998 | Tsai |
| 5,924,780 A | 7/1999 | Ammon |
| 6,045,173 A | 4/2000 | Tiesler |
| 6,234,438 B1 | 5/2001 | Plocher |
| 6,283,512 B1 | 9/2001 | Butterbaugh |
| 6,367,896 B1 * | 4/2002 | Peng ................ G06F 1/181 |
| | | 292/80 |
| 6,404,642 B1 | 6/2002 | Greenfield |
| 6,525,929 B2 | 2/2003 | Carr |
| 6,561,554 B2 | 5/2003 | Colbert |
| 6,603,655 B2 | 8/2003 | Hrehor |
| 6,607,224 B2 | 8/2003 | Hodges |
| 6,662,405 B2 | 12/2003 | Vitry |
| 6,711,856 B1 | 3/2004 | Hoffman |
| 6,711,859 B2 * | 3/2004 | Bell ................ B65D 11/00 |
| | | 220/4.02 |
| 6,935,661 B1 | 8/2005 | Farnsworth |
| 7,077,468 B2 | 7/2006 | Maierholzner |
| 7,367,638 B2 | 5/2008 | Marroquin |
| 7,478,889 B2 | 1/2009 | Marroquin |
| 8,854,823 B2 | 10/2014 | Wallace |
| 9,303,441 B2 * | 4/2016 | Bravo ................ E05F 1/1058 |
| 2003/0160460 A1 | 8/2003 | Crisp |
| 2008/0172945 A1 | 7/2008 | Hoffman |
| 2009/0045636 A1 | 2/2009 | Marroquin |

* cited by examiner

COMPRESSION ASSISTED SERVICE ACCESS FOR NARROW BORDER MOBILE INFORMATION HANDLING SYSTEMS

FIELD OF THE DISCLOSURE

The present disclosure generally relates to a method and apparatus for service access to components of a mobile information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. Components within mobile information handling systems performing various functions may need to be accessed for repair or upgrade from time to time.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Figure 1:
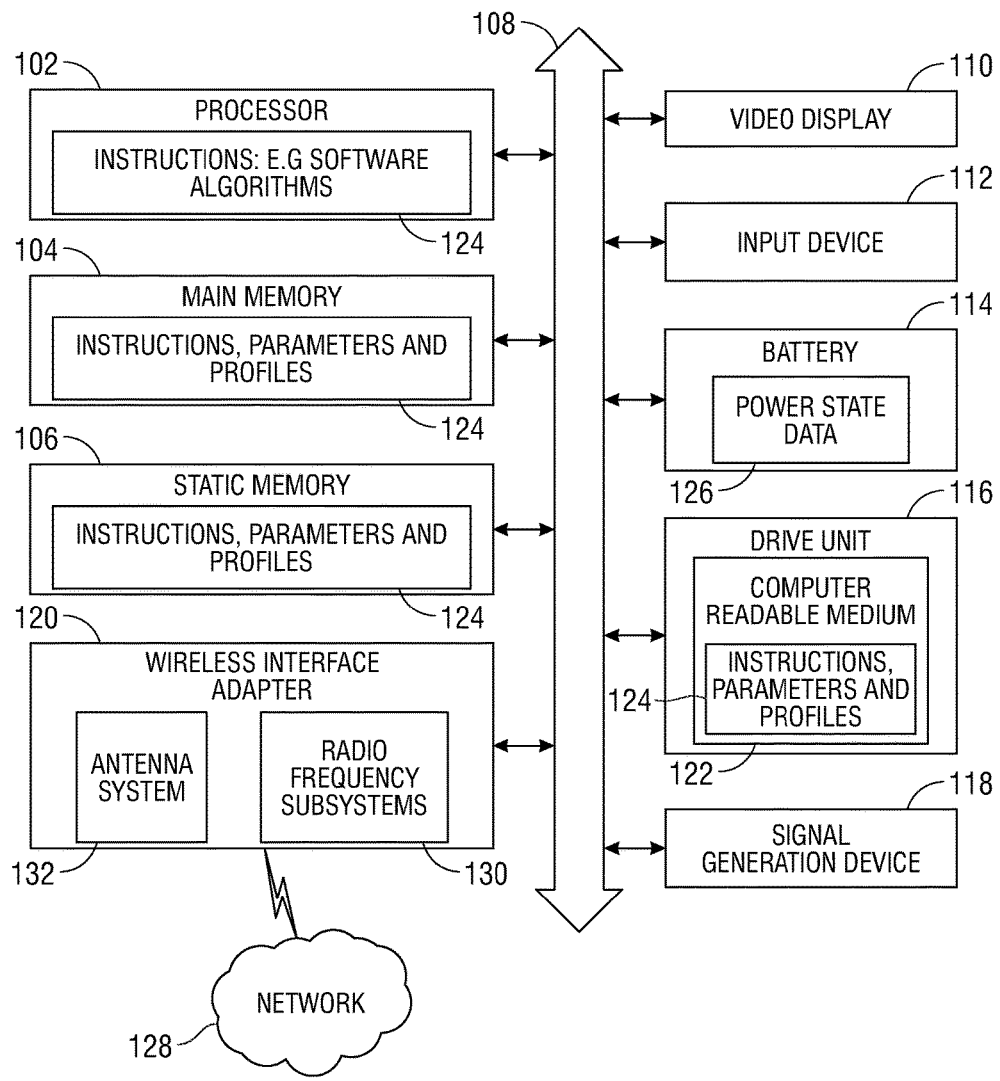
FIG. 1 is a block diagram illustrating an information handling system according to an embodiment of the present disclosure.

FIG. 1 shows an information handling system 100 capable of administering each of the specific embodiments of the present disclosure. The information handling system 100 can represent the narrow border mobile information handling systems shown in FIGS. 2-6. Information handling system 100 may represent a mobile information handling systems such as a wireless communication device. A mobile information handling system may execute instructions via a processor for a plurality of application programs and operating systems as understood. Information handling system 100 may also represent a networked server or other system. The information handling system 100 may include a processor 102 such as a central processing unit (CPU), a graphics processing unit (GPU), or both. Moreover, the information handling system 100 can include a main memory 104 and a static memory 106 that can communicate with each other via a bus 108.

As shown, the information handling system 100 may further include a video display unit 110, such as a liquid crystal display (LCD), an organic light emitting diode (OLED), a flat panel display, a solid state display, or a cathode ray tube (CRT). Display 110 may include a touch screen display module and touch screen controller (not shown) for receiving user inputs to the information handling system 100. In the case of several flat panel display systems including LCD or OLED displays, it is desirable to minimize an edge border and maximize the size of the display on the surface of the information handling system. In some cases, mobile information handling systems may have display glass bonded to an overall chassis thereby making access to internal components either unavailable or difficult without specialized tools such as heat guns or other systems. Other display device designs may utilize snap fit plastic bezels which may diminish the product design and finish for a small or near-zero bezel appearance and maximized display surface. Compression assisted service access of the embodiments of the present disclosure provide for a capability to have a narrow border or near-zero border design as well as providing simplified service access to internal components. Simplified service access provides increased efficiency and reduced cost for servicing mobile information handling systems such as those deployed within an enterprise and requiring fairly routine maintenance in some embodiments.

Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a mobile smartphone, or a wearable computing device.

The information handling system 100 can include a set of instructions 124 that can be executed to cause the computer system to perform any one or more of the methods or computer based functions. Various software modules comprising application instructions 124 may be coordinated by an operating system (OS) and via an application programming interface (API). An example operating system may include Windows®, Android®, and other OS types known in the art. Example APIs may include Win 32, Core Java API, or Android APIs. In a further example, processor 102 may conduct processing of sets of instructions in software, firmware, hardware or any combination of the same to achieve functions understood to be performed by the information handling system 100 according to disclosures herein. The computer system 100 may operate as a standalone device or may be connected such as using a network, to other computer systems or peripheral devices.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or subsystems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein. For example, instructions relating to the various software algorithms and data may be stored here. In particular, the instructions, parameters, and profiles 124 may reside completely, or at least partially, within the main memory 104, the static memory 106, and/or within the disk drive 116 during execution by the processor 102 of information handling system 100. As explained, some or all of the software, firmware or hardware instructions may be executed locally or remotely. The main memory 104 and the processor 102 also may include computer-readable media. Battery 114 may include a smart battery system that tracks and provides power state data 126. This power state data may be stored with the instructions, parameters, and profiles 124.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, wireless controller circuitry, amplifiers and other circuitry for wireless communications. Each radiofrequency subsystem 130 may communicate with one or more wireless technology protocols. The wireless adapter 120 may also include antenna system 132 which may be tunable antenna systems in some embodiments.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. The radio frequency subsystems 130 include wireless controllers to manage authentication, connectivity, communications, power levels for transmission, buffering, error correction, baseband processing, and other functions of the wireless adapter 120. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations.

In some embodiments, dedicated hardware implementations such as application specific integrated circuits, programmable logic arrays and other hardware devices can be constructed to implement one or more of the applications operating on the information handling system 100. Applications that may include the apparatus and systems of various embodiments can broadly include a variety of electronic and computer systems. One or more embodiments may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the applications executed by the information handling system may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

Several of the components of a mobile information handling system will reside within a case and mounted to a chassis as described in embodiments herein. The several components described may need to be accessed for repair or service from time to time. Mobile information handling systems with thinner and narrower border designs for the display screens will also have access seams or edges that may be difficult to open without highly specialized tools or risk of damage to the system. Thus, access via the compression assist mechanism in the chassis and case of the information handling system provides a seam for simpler access to the components described herein for purposes of repair, upgrade, or the like.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
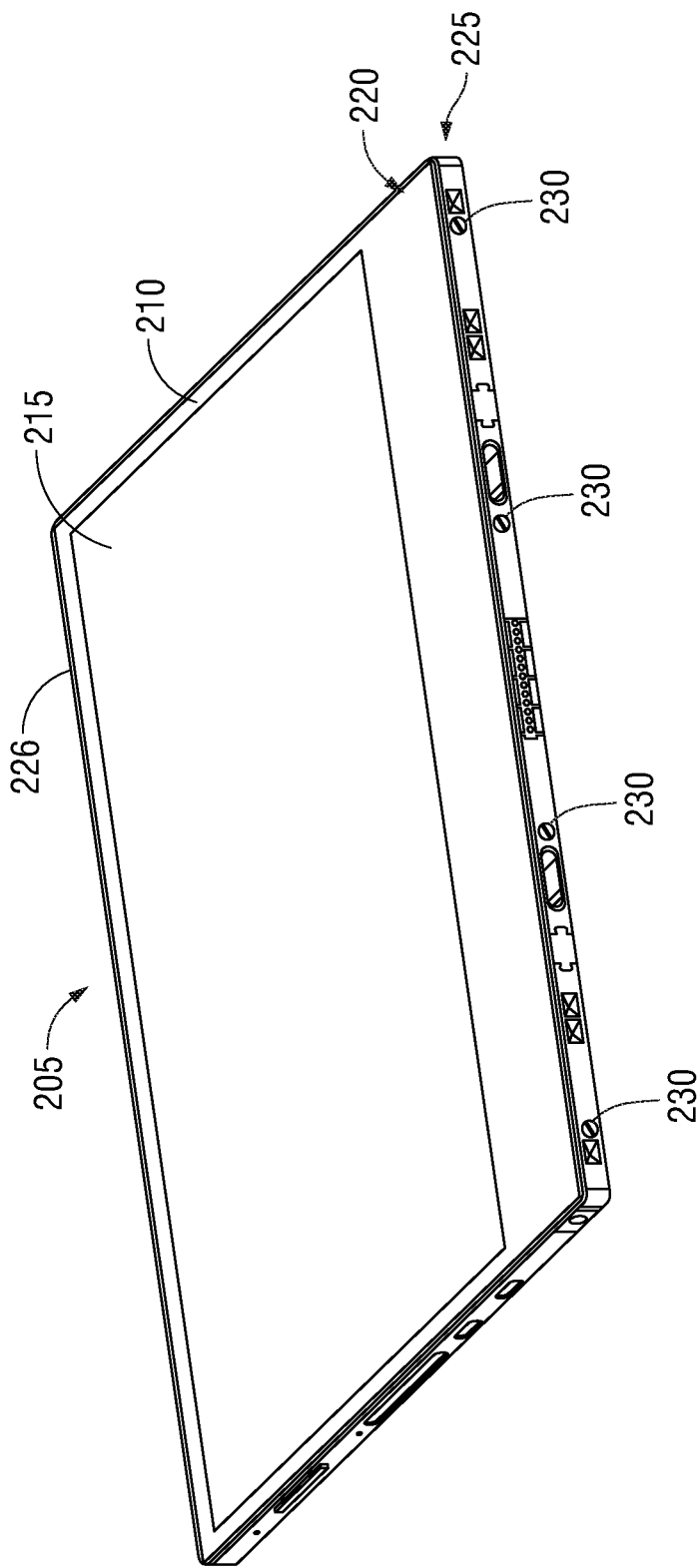
FIG. 2 is a graphic diagram of a mobile information handling system with a narrow border according to an embodiment of the present disclosure.

FIG. 2 illustrates a mobile information handling system 205 having a narrow border 210 for a display screen 215 according to an embodiment of the present disclosure. Mobile information handling system 205 may function in accordance with the description of an information handling system such as described with respect to FIG. 1. In a particular embodiment, mobile information handling system 205 includes service access edge 220 along an outer edge of display screen 215 and border 210. The service access edge 220 may include a small plastic or rubberized bezel material that protects the glass or other surface of the display screen 215 and border 210 in some embodiments.

A near side 225 of the mobile information handling system 205 as shown may include several ports, speakers, buttons or other structures as needed for the functionality of the mobile information handling system 205. It is understood that near side 225 refers to the front side as viewed in FIG. 2, but that in the present embodiment four other sides may include additional ports, speakers, buttons, or other structures understood to be available on mobile information handling systems of various designs. In the presently shown embedment of FIG. 2, the near side 225 is a service access side for access to internal components of the mobile information handling system 205. The access side 225 may have mechanical connectors 230 for engaging the access side 225 of the chassis with the display screen 215 to hold the display screen down. In a particular embodiment, near side 225 shown in FIG. 2 has access screws as mechanical connectors 230 which are removable screws or other fasteners engaged into the near side 225. In the shown embodiment, four access screws 230 are shown. In other embodiments, alternative fasteners may be used as mechanical connectors 230 including clips, latches or other fasteners as understood in the art. A clip, latch or other fastener may be opened or removed to disengage the display screen 215 from the access side 225 of the chassis and release pressure on an internal spring applied by the mechanical connectors 230 holding the display screen 215 in place along the access side 225.

Along the far side 226 of the mobile information handling system the display screen 215 and border 210 may be hinged to the main chassis. It is understood that far side 226 refers to the back side as viewed in FIG. 2. Hinging the display screen 215 along one side of the chassis of the mobile information handling system may allow the display screen to be opened in a clamshell fashion as illustrated further below in FIG. 3. Any side may be hinged, however the far side 226 is shown hinged in the presently shown embodiment of FIG. 3. In some embodiments no hinged side of the display screen 215 may be used. In yet other embodiments, one or more interlocks (not shown) may be used along back side 226 or another side of the chassis with a corresponding guides mounded along the back edge or the side edges of a display screen that may be received by the interlock to maintain alignment of the display screen as it recesses down into the chassis. In one example embodiment, interlocks along a far side 226 of the chassis may form a natural hinge opposite to the access side 225. In an example embodiment, the interlock connectors may be snap fit interlock connectors.

The snap fit interlock connectors may be opened via a pry force applied to the access seam in some embodiments. The access seam may be opened by the compression force released by the compression assist spring, such as a compression assist foam pad, or other structure internal to the chassis of the mobile information handling system 205 when a mechanical connector such as a chassis connector screw is released or removed. In other embodiments, the snap fit interlock connectors may be disengaged via the counter force applied by the spring along an access edge when a mechanical connector is opened or removed along the access edge. The interlock connectors may be internal to the mobile information handlings system 205 and may provide for a unibody chassis appearance of the display screen 215 with the chassis of the mobile information handling system 205 by providing for the display screen surface to sit down into the chassis or flush with the chassis but still provide for simplified service access to internal components.

Figure 3:
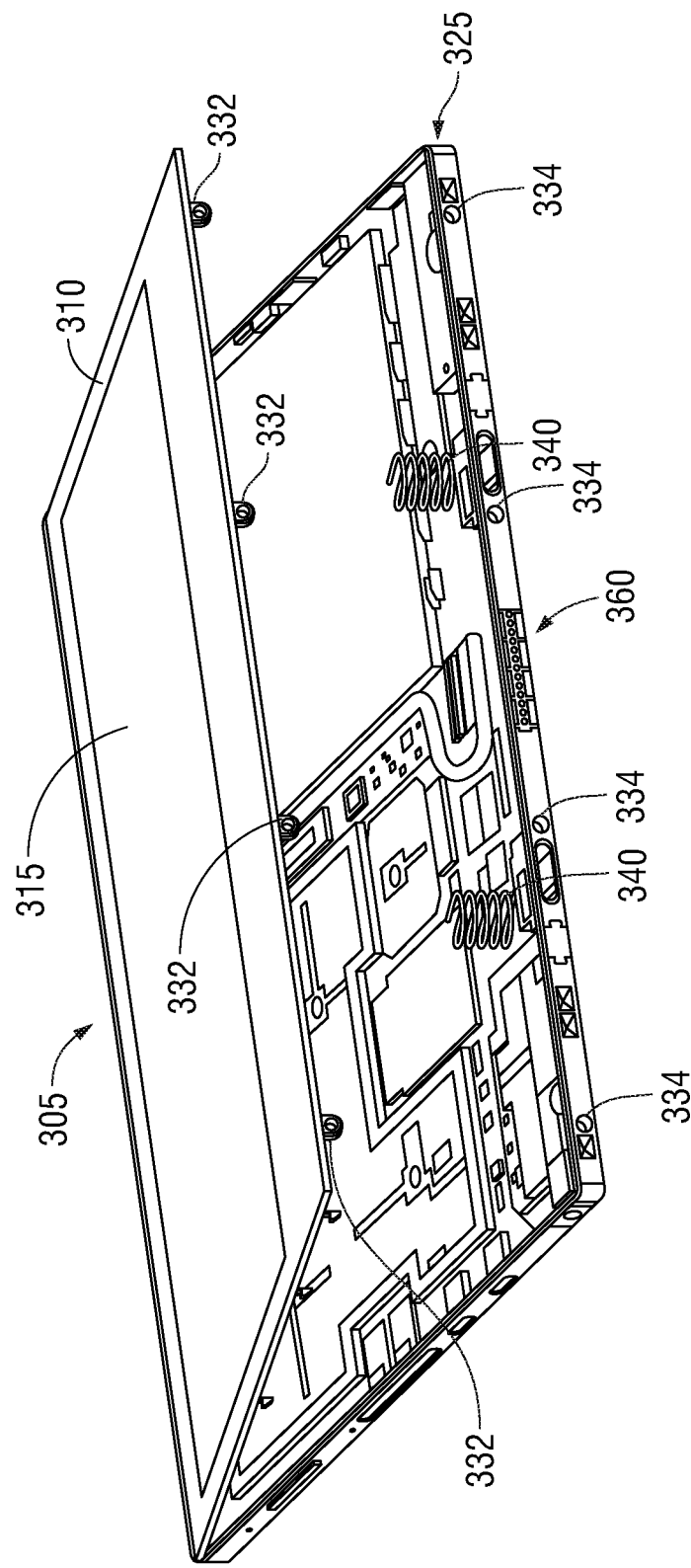
FIG. 3 is another graphic diagram of a mobile information handling system with a narrow border according to an embodiment of the present disclosure.
Figure 4:
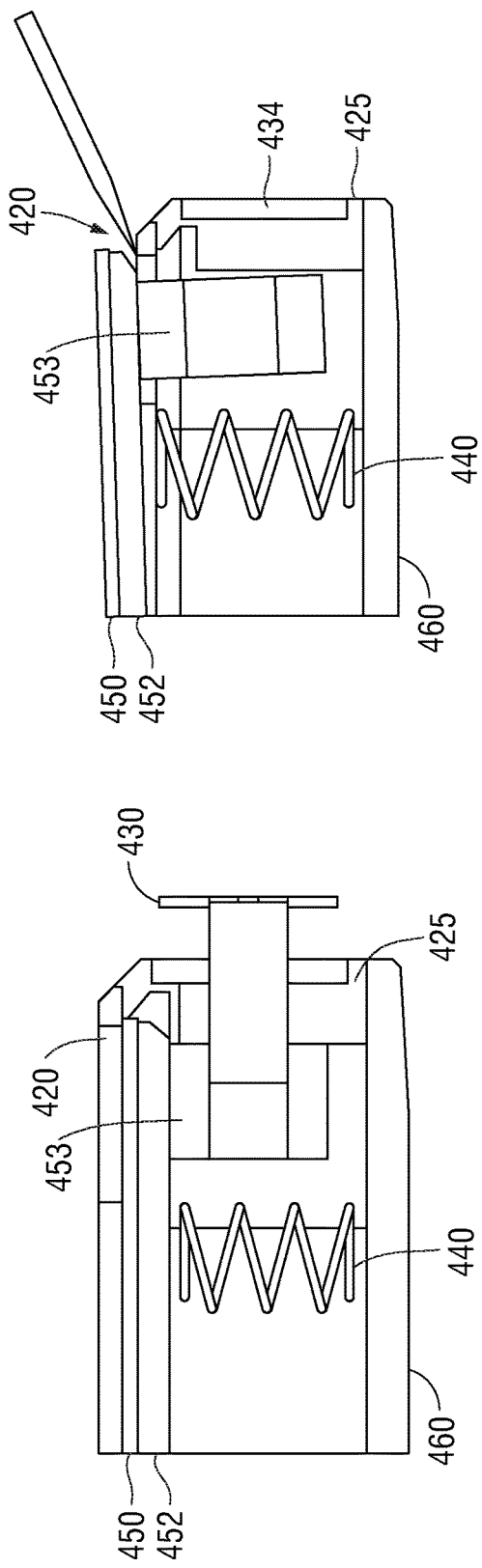
FIG. 4A is a cross-section diagram of a mobile information handling system with a compression assisted service access system according to an embodiment of the present disclosure.
FIG. 4B is another cross-section diagram of a mobile information handling system with a a compression assisted service access system according to an embodiment of the present disclosure.

FIG. 3 illustrates a view of mobile information handling system 305 having a narrow border 310 for a display screen 315 according to an embodiment of the present disclosure. In FIG. 3, the mobile information handling system 305 is shown with the display screen 315 opened allowing service access to internal components. Mobile information handling system 305 may function in accordance with the description of an information handling system such as described with respect to FIG. 1. In a particular embodiment, mobile information handling system 305 is hinged along a far edge. A plastic or rubberized bezel material along the edge of the narrow border 310 of display screen 315 may include screw attachment structures 332 such as a screw receiving nub or other connector receiving nub as part of or attached to the plastic bezel or other connector attachment structures 332. In another embodiment, the screw attachment structures or other mechanical connector attachment structures 332 may be directly attached to the display glass of display screen 315 and narrow border 310. Connector attachment structures 332, such as a screw attachment nub with receiving hole, may be aligned with screw holes 334 on the near side 325 of the information handling system chassis 360 in an embodiment. In other example embodiments, a connector attachment structure 332 on the display glass or the plastic bezel of display screen 315 may include a latch receiver or other connector attachment structure (not shown). Connector attachment structures 332 may be made of the same material as the display screen bezel or may be made of different material such as aluminum or other types of plastic.

As with FIG. 2, near side 325 of the mobile information handling system chassis 360 as shown may include several ports, speakers, buttons or other structures as needed for the functionality of the mobile information handling system 305. It is understood that near side 325 refers to the front side as viewed in FIG. 3 through which service access may be made. New side 325 may be opposite of a hinged side such that a clam shell hinged opening may provide access on the opposite side in some embodiments. Interlocks and interlock receivers may be mounted on the display 315 or plastic bezel as well as the chassis 360 of the mobile information handling system 305 along any side including the far side, near side 325, left or right sides as viewed in FIG. 3.

Access is shown through near side 325 and opposite any hinged side of the display screen 315 and chassis 360. It is understood that screw holes 334 or another attachment such as a latch may be mounted on any side and opposite to a hinged side (if any) for access from any side of the information handling system chassis 360. Thus, any side of the mobile information handling system may serve as an access side similar to the near side 325 as depicted in FIG. 3. For example, the left side of mobile information handling system chassis 360 may be instead determined to be an access side for service access in some embodiments. A hinged side in an aspect, if utilized in the left-side access embodiment, may be oriented opposite on the right side as viewed in FIG. 3. Further, it is contemplated that any side of chassis 360 may be the access side in certain embodiments. Additionally, in some embodiments the opposite side to the access side of the chassis 360 may be hinged with the display screen 315 to provide for clamshell opening access to internal components.

In embodiments of the present disclosure, a compressive force spring or compressive force pad 340 may be oriented along the access side of chassis 360. As shown, compressive force springs 340 are depicted mounted internal to mobile information handling system 305 along an access side of chassis 360. In an embodiment, the compressive force structures 340 may be mounted to either the chassis 360 or to the display screen 315 or bezel. It is understood that several types of compressive force structures 340 may be used including a shape memory foam, a leaf spring, a coiled compression spring, torsion spring, or other springs of any variety or shape. For example, several torsion springs may be mounted along an access side or may even be oriented along a hinged side to provide a opening force along the hinge. A compression spring may be mounted along the access side of chassis 360 in an embodiment to provide a compressive counter force to the display screen 315 so that it will pop up upon release of the screws from screw connector nubs 332 or upon release of another type of connector, clip, or latch.

In some embodiments of the present disclosure, compressive force structures 340 are compressive foam pads mounted on either the chassis 360 or the display screen 315.

In an aspect, the foam pads are another type of spring used to exert a compressive counterforce on the display screen 315 held by screws in holes 334 and screw receiving nubs 332. Compression foam pads 340, in an embodiment, are a shape memory foam that does not set or take to a substantially different shape or resists taking a different shape when compressed. The foam pad springs acting as compressive force structures 340 may be mounted in locations similar to those described above for some embodiments. The foam pads acting as springs at 340 would similarly provide a constant force on an access side or other side of the display screen and against the display screen 315 or plastic bezel such that upon release of the screws at 332 and 334 or release of another mechanical connector such as a latch or pin, a part line access seam is formed along the edge of the display screen 315 between the glass and the bezel or between the bezel of display screen 315 and chassis 360. Either configuration is contemplated. A tool may be used within the access seam to access the internal components of mobile information handling system 305. An example type of shape memory foam that may be used in some embodiments includes Poron® foam. Additional types of shape memory foam may also be used in some embodiments including various urethane class foam pads. In some instances, either open cell foam or closed cell foam may be used however open cell foam may have more rugged shape memory properties as a spring. Other materials are contemplated as well including natural or synthetic rubber or rubberized pad components that are compressible but exert a counter force to return to their original form and provide an access seam in an access side for some embodiments. Additional compressive force structures 340 may include a compressible air bladder made of a shape memory material that may exert a counter force onto display screen 315 upon release of screws or other fasteners along an access side or other side of the mobile information handling system.

In one aspect of the present embodiments, the screw holes 334 and screw receiving nubs 332 may be mounted along sides of the mobile information handlings system chassis 360. In one example embodiment, these screw holes 334 and screw receiving nubs 332 may be mounted along the left or right side of the mobile information handling system chassis 360 as well as corresponding locations along the display screen 315 or the associated bezel. In a further aspect, left or right side screws may be used in addition to the screws used to secure the access side or near side 325 in some embodiments. In other words, mechanical connectors 330 to hold down display screen 315 may be mounted along chassis sides other than or in addition to the access side, such as 325.

In other aspects of the present embodiments, the compressive force structures 340 may also be mounted along one or more sides of chassis 360 that is not the access side. For example, compressive force structure 340 may be mounted along the left or right side of the mobile information handling system chassis 360 in some embodiments. Compressive force structures 340 may be mounted using mechanical attachment means to the chassis 360 and display screen 315 or bezel, may be mounted using adhesives, or may be mounted using any other mechanical or other means as understood by those of skill working with the type of compressive force structures 340 used. For example, shape memory foam pads may be mounted using adhesive in some embodiments. Other springs may be mounted with mechanical attachment such as welds, clips or other fasteners in some embodiments.

Along an opposite side of the mobile information handling system from the access side 325, the display screen 315 and border 310 may be hinged to the main chassis 360. Any type of hinge may be used as understood by those of skill including a continuous hinge, one or more barrel hinges, one or more living hinges, or any other of a variety of hinges. Any side of information handling system 305 may be hinged, or in some embodiments no hinged side of the display screen 315 may be used. In some embodiments, one or more interlocks (not shown) may be used along the back edge or the left or right side edges as viewed in FIG. 3 that may maintain alignment of the display screen as it is recessed down into the chassis and similar to the descriptions above. In an example embodiment, the interlock connectors may be snap fit interlock connectors. The interlock connectors may be internal to the mobile information handlings system chassis 360 and may be mounted along the sides of the chassis 360 and the corresponding edges of the display screen 315 and border 310. The interlock connectors may provide alignment for a unibody chassis appearance of the display screen 315 with the chassis 360 of the mobile information handling system 305, but still provide for simplified service access to internal components.

FIG. 4A and FIG. 4B illustrate a cross section of an example cutaway for an access side of a mobile information handling system according to an example embodiment. In particular, the embodiment of FIG. 4A and FIG. 4B show the access side 425 of the mobile information handling system chassis 460. The mobile information handling system includes a glass 450 or other surface material of a display screen and an underlying LCD or OLED bezel 452 for the display screen. The edge of the mobile information handling system is shown such that the active portion of the display screen is not show, but instead the bezel 452 supporting the glass 450 of the display screen along the edge of the display screen is shown.

In the present embodiment, the display screen bezel 452 may be made of plastic or another suitable material to support the display screen. Mounted on the display screen bezel 452 in FIGS. 4A and 4B is a screw receiver 453 nub or other attachment structure for latching or securing the display screen against the counterforce of the compressive force structure 440. Compressive force structure 440 may be a foam pad, compression spring or the like in some embodiments. Screw receiver 453 nub may be made as part of the display screen bezel or may be attached to the display screen bezel 452 in various embodiments. In other embodiments, screw receiver 453 may be mounted to the glass 450 or another structure of the display screen. In FIG. 4A, screw receiver 453 may receive screw 430 through a screw hole in access side 425. In other embodiments, a pin or latch may be used to secure the display screen glass 450 flush in line with or below any chassis edge or bezel to provide a unibody appearance. Access seam 420 is shown closed in FIG. 4A.

In FIG. 4B, screw 430 is removed leaving screw hole 434 in access side 425. As shown in FIG. 4B, display screen glass 450 and display screen bezel 452 are popped up providing an access seam 420 opened for a tool to pry open access to the internal components of the mobile information handling system. Screw receiver 453 nub is similarly lifted on extended compression spring, such as a shape memory foam pad, that is used as compressive force structure 440 with screw 430 removed. Also shown in FIG. 4A and FIG. 4B is an access seam along a part line by the plastic or rubberized chassis bezel below which display glass 450 is recessed in FIG. 4A, but above which it "pops" due to the compressive counterforce being released in FIG. 4B. When popped up, an opened access seam 420 is provided in an embodiment.

Figure 5:
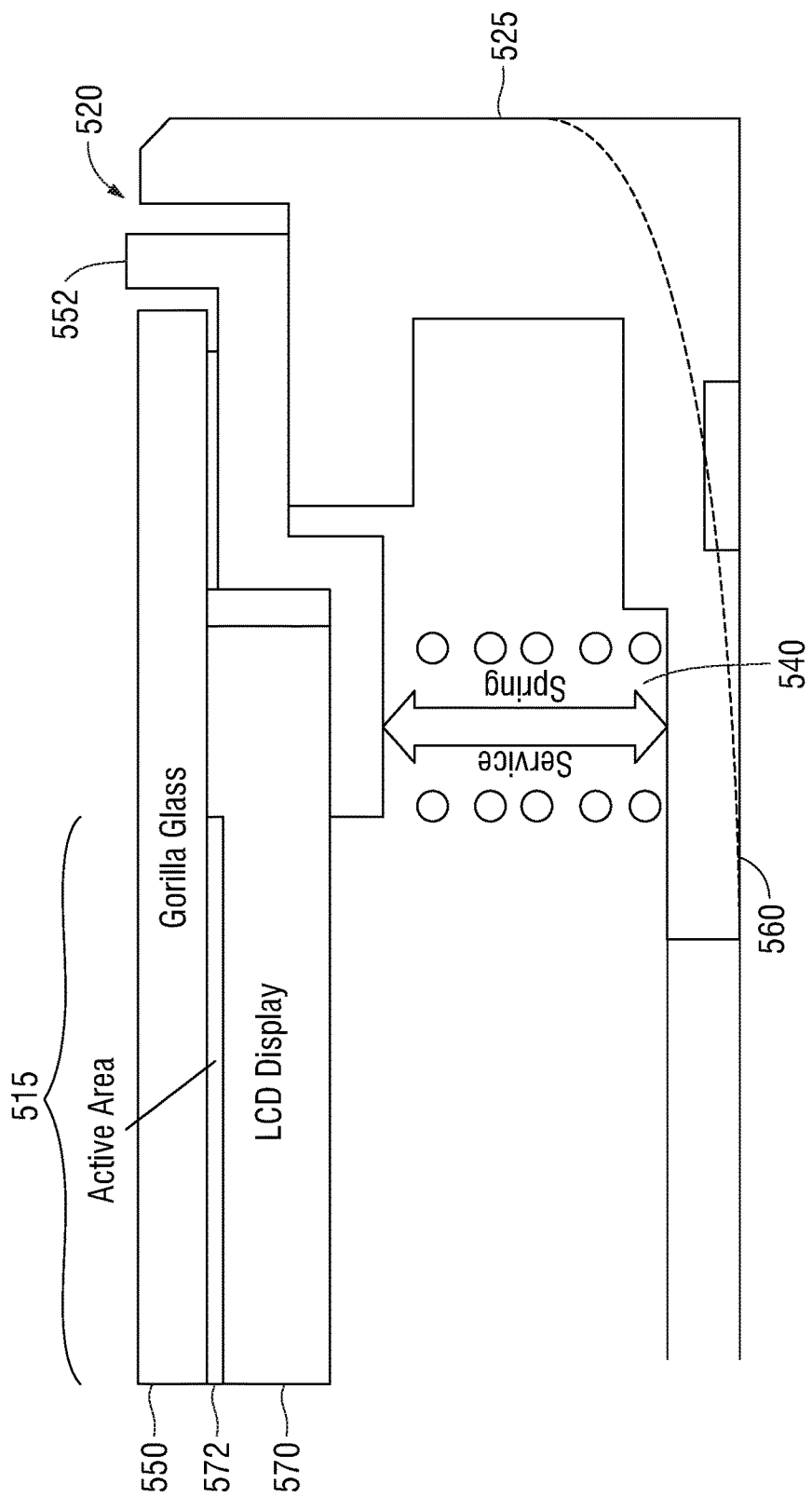
FIG. 5 is a cross-section diagram of a mobile information handling system with a compression assisted service access system according to another embodiment of the present disclosure.

FIG. 5 illustrates another cross-section view of a mobile information handling system on an access side 525 according to an example embodiment of the present disclosure. The embodiment of FIG. 5 shows the compressive force structure 540 is in a closed position and the access seam 520 closed as well. In FIG. 5, a partial view of the active area 572 of the display screen 515 is shown including the display glass 550, the LCD or OLED display 570 supported by the display bezel 552. The active area 572 may include the pixel electronics or other active components of the flat panel display device 515.

The mobile information handling system of FIG. 5 is shown where a compressive force structure 540 such as a service spring or compression resistive foam pad is not located near a screw location on the access side 525 of the mobile information handling system. The compressive force structure 540 of the present embodiment is mounted between the chassis 560 and the display screen bezel 552. In this way, the compressive force structure 540 does not apply force directly to the gorilla glass 550 or other surface of the display screen 515 and instead applies force to the protective display screen bezel 552. It is understood however that the compressive force structure 540 could be mounted such that it applies counter-force directly to the glass in some embodiments. In the present embodiment, the compressive force structure 540 may be mounted on the chassis 560 or on the display screen bezel 552. The compressive force structure 540 of the embodiment of FIG. 5 is mounted such that it is not exerting force on the active area 572 of the display screen 515. Accordingly, distortion effects on the display screen 515 may be avoided while still providing for an ability to open the access seam 520 upon release of a screw, latch, pin, or other attachment elsewhere along access side 525 or in another location on the mobile information handling system.

Figure 6:
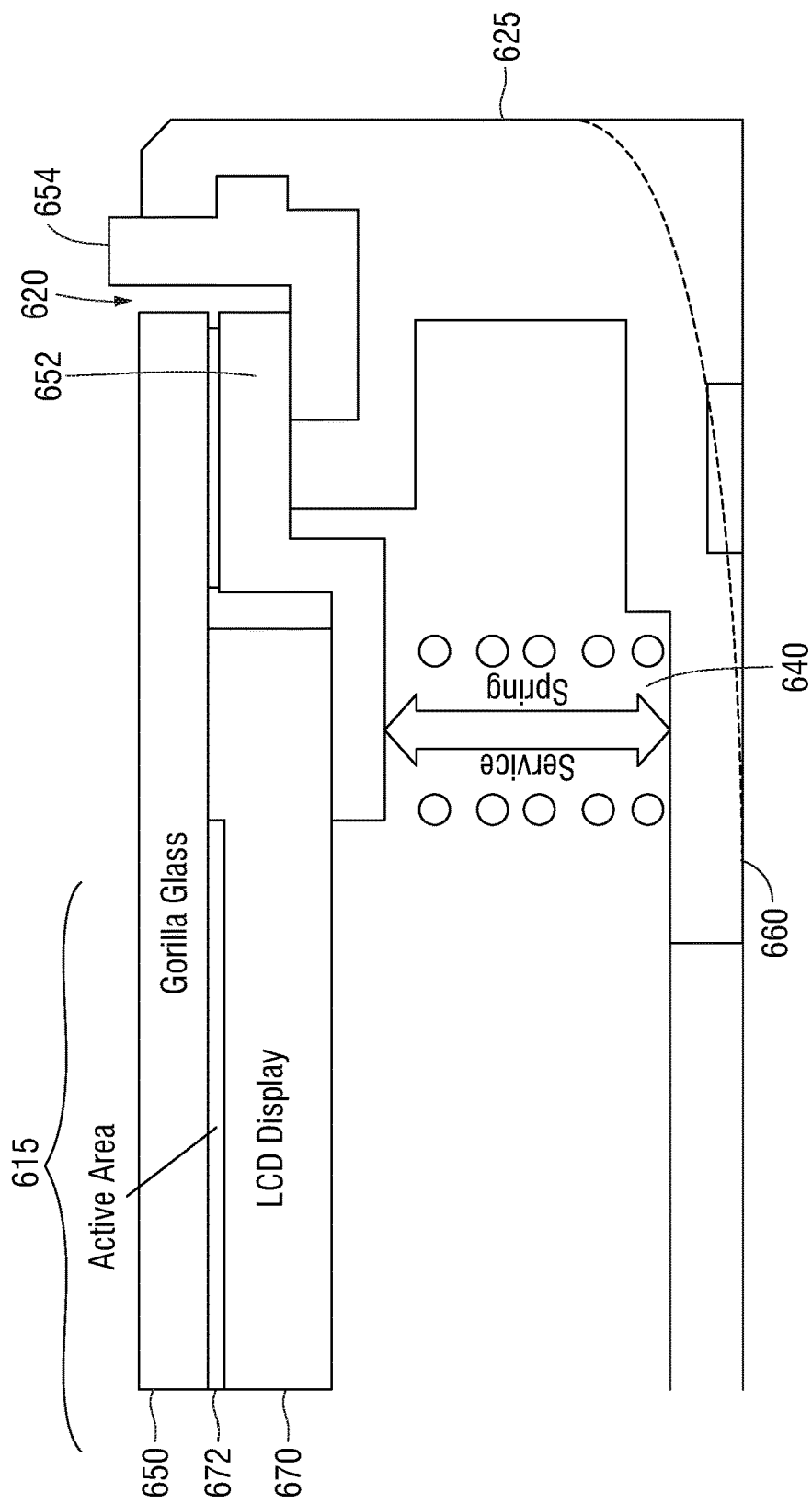
FIG. 6 is a cross-section diagram of a mobile information handling system with a compression assisted service access system according to yet another embodiment of the present disclosure.

FIG. 6 illustrates yet another cross-section view of a mobile information handling system on one access side 625 according to an example embodiment of the present disclosure. The embodiment of FIG. 6 shows a chassis bezel 654 located between the chassis 660 and an access seam 620 through which access to the internal components of the mobile information handling system may be gained according to the embodiments herein. The compressive force structure 640 is also in a closed position and the access seam 620 closed. In FIG. 6, a partial view of the active area 672 of the display screen 615 is shown including the display glass 650, the LCD or OLED display 670. Display 670 and the glass 650, such as gorilla glass is supported by the display bezel 652 from the bottom but not necessarily from the side although embodiments may include both as well as a chassis bezel 654. However, in some embodiments, minimal bezel on the side is desired although some protection to the side of glass 650 is nonetheless desired, so a single side protection bezel may be used. Chassis bezel 654 may be flush with glass 650 and chassis 660 or may be slightly raised to provide additional protection in various embodiments. The active area 672 may include the pixel electronics or other active components of the flat panel display device 615.

The mobile information handling system of FIG. 6 is shown with a compressive force structure 640 similar to various embodiments herein and may include such as a service spring or compression resistive foam pad. The compressive force structure 640 in this embodiment is also not shown located near a screw location on the access side 625. The compressive force structure 640 of the present embodiment is mounted between the chassis 660 and the display screen bezel 652 but not under the active area 672 of the display screen 615. In this way, the compressive force structure 640 does not apply a counter force to pop open the display screen directly to the gorilla glass 650 or other surface of the display screen 615 and instead applies force to the protective display screen bezel 652. In some embodiments however, the compressive force structure 640 may be mounted such that it applies counter-force directly to the glass 650 or a pad on the glass 650 in some embodiments to reduce thickness of the mobile information handling system. As with other embodiments, the compressive force structure 640 may be mounted on either the chassis 660 or on the display screen bezel 652. The access seam 620 may be popped open upon release of a screw, latch, pin, or other attachment elsewhere along access side 625 or in another location on the mobile information handling system to permit access by a simple pry tool.

It is understood that the structures and concepts described in the embodiments above for FIGS. 2-6 may be constructed using a variety of the components. For example, the compressive force structure may be any of or a combination of foam pads, springs or other structures understood in the art to apply a counter force when compressed such as by the display screen set into a chassis of a mobile information handling system. It is also understood that in some varied embodiments certain components may not be utilized at all such as the hinge on one side of the information handling system, the chassis bezel or the aspect of the display bezel on the side of the glass, or the interlocks along sides of the chassis. Further, it is also contemplated that variations on the systems described herein may also be combined with portions of any other embodiments in the present disclosure to form a variety of additional embodiments from aspects of those embodiments described herein.

In some embodiments, dedicated hardware implementations such as application specific integrated circuits, programmable logic arrays and other hardware devices can be constructed to implement one or more of the internal components described herein or portions of one or more of the internal components described herein. Applications that may include the apparatus and systems of various embodiments can broadly include a variety of electronic and computer systems. One or more embodiments described herein may implement functions using two or more specific interconnected hardware structures to provide a simplified access to internal components of a mobile information handling system while maintaining a unibody appearance between the display screen and the chassis.

In accordance with various embodiments of the present disclosure, the compressive force structures described are understood by those of skill in the art to be a structure when placed between to objects and subject to compressive stress responds with a counterforce against that compressive stress. Example specific structures such as compressive pads, foam, springs, bladders, or shape memory devices that return to an original shape after stress of compression is release and described herein may be implemented by numerous embodiments described.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries. Further, devices, structures or other aspects of the mobile information handling systems described or shown as coupled or connected to one another or applying force to one another may be connected or coupled in all cases through one or more additional intermediary structures or devices or some structures and devices may not be needed or intermediary as shown or described. Several example embodiments are described where such a coupling or connection of structures may exist.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A mobile information handling system comprising:
   a chassis having a processor and a memory;
   a display screen operatively coupled to the chassis;
   the chassis having a compressive force foam pad internally mounted thereon and compressed between the chassis and the display screen;
   an attachment screw inserted through an access side of the chassis and fittingly attached to a screw receiving nub operatively coupled to the display screen, wherein the attachment screw maintains pressure from the display screen on the compression force foam pad; and
   an access seam at the edge of the display screen operable to open due to a counter force exerted by the compression force foam pad when the attachment screw is removed from the screw receiving nub.

2. The system of claim 1, wherein the display screen includes a glass surface, display electronics and a display screen bezel operatively coupled between the compressive force foam pad and the display screen glass surface.

3. The system of claim 1, wherein a plurality of attachment screws are inserted through the access side of the chassis and fittingly attached to a plurality of screw receiving nubs operatively coupled to the display screen.

4. The system of claim 1, wherein the compressive force foam pad is mounted on the chassis along the access side of the chassis.

5. The system of claim 1, wherein the compressive force foam pad engages the display screen in a closed position outside an active area of the display screen.

6. The system of claim 1, further comprising:
   a hinge mounted on a second side of the chassis and opposite to the access side to provide hinged access in an open position.

7. The system of claim 1, further comprising:
   an interlock internally mounted along a second side of the chassis;
   a corresponding guide mounted on the display screen for aligning the display screen with respect to the chassis.

8. The system of claim 7, wherein the interlock internally mounted along a second side of the chassis aligns the display screen via snap fit engagement of the corresponding guide into the interlock and wherein the interlock is disengageable from the corresponding guide with application of force.

9. A mobile information handling system comprising:
   a chassis having a processor, a memory, and a wireless interface;
   a display screen operatively coupled to the chassis;
   the chassis having a spring internally mounted thereon and compressed between the chassis and the display screen;
   an attachment screw inserted through an access side of the chassis and fittingly attached to a screw receiving nub operatively coupled to the display screen, wherein the attachment screw maintains pressure from the display screen on the spring; and
   an access seam at the edge of the display screen operable to open due to a counter force exerted by the spring when the attachment screw is removed from the screw receiving nub.

10. The system of claim 9, wherein the spring is selected from a compression spring, a leaf spring, or a shape memory urethane foam pad.

11. The system of claim 9, wherein a plurality of attachment screws are inserted through the access side of the chassis and fittingly attached to a plurality of screw receiving nubs operatively coupled to the display screen.

12. The system of claim 9, wherein the spring is mounted on the chassis along the access side of the chassis.

13. The system of claim 9, wherein the spring is mounted on the display screen corresponding to the access side of the chassis.

14. The system of claim 9, wherein the spring engages the display screen in a closed position outside an active area of the display screen.

15. The system of claim 9, further comprising:
   the display screen hinged to the chassis along a second side of the chassis.

16. The system of claim 9, further comprising:
   a chassis bezel mounted between the chassis and edge of the display screen wherein the access seam is disposed between the chassis bezel and the edge of the display screen.

17. A mobile information handling system comprising:
   a chassis having a processor, a memory, and a wireless interface;
   a display screen operatively coupled to the chassis;
   the chassis having a spring internally mounted thereon and compressed between the chassis and the display screen;
   a mechanical connector fittingly engaging an access side of the chassis with the display screen, wherein the mechanical connector maintains pressure on the spring by holding the display screen in a closed position; and an access seam at the edge of the display screen operable to open due to a counter force exerted by the spring when the mechanical connector is disengaged from the display screen.

18. The system of claim 17, wherein the spring is selected from a compression spring, a leaf spring, or a shape memory urethane foam pad.

19. The system of claim 17, wherein mechanical connector is selected from a mechanical latch, a pin, or an attachment screw for engaging the access side of the chassis with the display screen.

20. The system of claim 17, further comprising:
the display screen hinged to the chassis along a second side of the chassis.

\* \* \* \* \*